(12) United States Patent
Burrows (10) Patent No.: US 9,321,924 B2
(45) Date of Patent: Apr. 26, 2016

(54) MAGNETIC LOAD SUPPORTING INKS

(71) Applicant: DEVRIAN INNOVATIONS, LLC, Warren, NJ (US)

(72) Inventor: Roger Burrows, Wilton, CT (US)

(73) Assignee: HORIZON GROUP USA, INC., Warren, NJ (US)

( * ) Notice: Subject to any disclaimer, the term of this patent is extended or adjusted under 35 U.S.C. 154(b) by 149 days.

(21) Appl. No.: 13/986,192

(22) Filed: Apr. 10, 2013

(65) Prior Publication Data
US 2014/0308490 A1  Oct. 16, 2014

Related U.S. Application Data

(63) Continuation of application No. 12/587,713, filed on Oct. 13, 2009, now abandoned.

(60) Provisional application No. 61/196,163, filed on Oct. 14, 2008.

(51) Int. Cl.
| | |
|---|---|
| *G11B 5/842* | (2006.01) |
| *B42D 25/369* | (2014.01) |
| *C09D 11/037* | (2014.01) |

(52) U.S. Cl.
CPC ....... *C09D 11/037* (2013.01); *Y10T 428/24901* (2015.01)

(58) Field of Classification Search
None
See application file for complete search history.

(56) References Cited

U.S. PATENT DOCUMENTS

| | | | |
|---|---|---|---|
| 3,790,754 A | 2/1974 | Rainey et al. | |
| 4,121,157 A | 10/1978 | Welman et al. | |
| 4,462,832 A | 7/1984 | Jettmar et al. | |
| 5,843,329 A | 12/1998 | Deetz | |
| 2006/0097512 A1* | 5/2006 | Isherwood | D21H 21/42 283/72 |
| 2010/0098921 A1* | 4/2010 | Burrows | 428/206 |

OTHER PUBLICATIONS

EP 09821098.2 European Search Report mailed Dec. 9, 2013, 10 pages—English.
Database WPI, Week 200911, Thomson Scientific, London GB; AN 20090-B40265, XP002716640, & KR 2008 001392 A (Korea Security Printing & Minting Corp), Jan. 3, 2008, Abstract, 2 pages.
Canadian Pat. Appln. Serial No. 2,771,132, Notice of Allowance, dated Apr. 2, 2015, 1 page.

* cited by examiner

*Primary Examiner* — Mandy Louie
(74) *Attorney, Agent, or Firm* — Andrew F. Young, Esq.; Lackenbach Siegel, LLP (57) ABSTRACT

A magnetizable ink contains at least 65% of magnetizable particles having a modal diameter between 3 μm and 10 μm. The particles may have a size distribution with 0% above 18 micron and not greater than 20% under 0.5 micron. The particles may have a surface area less than 50,000 cm² per cm³, and/or the ink may have a viscosity less than 16,000 cps when ready to print. Where the particles are rounded, magnetically soft iron particles, the surface area may be less than 12,000 cm² per cm³ and the viscosity may be less than 1,500 cps.

8 Claims, 3 Drawing Sheets

MAGNETIC LOAD SUPPORTING INKS

CROSS REFERENCE TO RELATED APPLICATION

This application is a continuation of co-pending U.S. application Ser. No. 12/587,713 filed on Oct. 13, 2009, which claims benefit of U.S. Provisional Patent Application No. 61/196,163 titled "Spot printed, magnetic load supporting inks", filed on Oct. 14, 2008 in the name of Burrows, which is incorporated herein by reference in its entirety. Reference is made to commonly invented and assigned U.S. Pat. Nos. 6,217,405, 6,547,626 and 7,192,628 which are incorporated herein by reference in their entirety.

BACKGROUND OF THE INVENTION

The application relates generally to printable, magnetizable inks, to substrates printed with such inks, and to formulating, printing, and temporarily or permanently magnetizing such inks to magnetically support loads with a significant magnetic load to ink thickness ratio. The application further relates to such inks that can be or are overprinted with high resolution images and/or indicia.

Material having magnetic properties may be incorporated into a variety of applications. For instance, manufacturers have incorporated magnetic material into educational, instructional and interactive devices for children. Magnets and devices having magnetic properties have a special appeal due to the invisible properties of magnetism. There are numerous types of interactive toys, games, appliances, and displays, in which material having magnetic properties is used to advantage to freely move magnetically attached objects, or toys. Also, there are many applications whereby magnetism is used to magnetically connect objects with objects, and surfaces to surfaces.

One method of incorporating the invisible properties of magnetism into a product involves adding a ferromagnetic material, such as iron particles, into conventional paints. The iron particles are blended, or mixed, into the paint to form a temporarily magnetizable paint. The temporarily magnetizable paint is then applied in the same way as ordinary paint to the surface of a substrate, such as wall board, wood, sheet rock, plywood, or the like to make signs and other types of displays having a surface to which a magnet can attract itself. A disadvantage with this approach is that paint is commonly applied by hand and the thickness of the paint applied is then virtually impossible to control.

In addition, the formulations used in practice are low in Fe density due to the fact that the viscosity becomes too high with concentrations of Fe powder over about 60 or 70%, and are messy to apply. Further, particle distribution is often poor, necessitating repeated coatings to ensure useful magnetic interaction. A further limitation is that conventional temporarily magnetizable paints were not paired with specific permanently magnetized materials or elements to be used in conjunction with the temporarily magnetizable paint. The permanently magnetized element might be indicated, but only in very broad terms, such as "use with rubber magnets of about 0.5 mm thick," or "use with rare Earth magnets." The permanently magnetic objects, permanently magnetized rubber magnets, or the like need to be specified with very wide tolerances to accommodate the variations in the method of application of the paint. As a result, the magnetic efficiencies were far lower than should theoretically be obtainable with available magnetic materials. A further disadvantage of using the magnetic paint described above is that a second process is required to apply images to the magnetic paint. The means to do this can necessitate using colored paints and then painting images onto the magnetic paint—or by covering with wallpaper.

Another previously proposed way of incorporating the invisible properties of magnetism into a product involves positioning metal plates between substrates. See, for example, U.S. Pat. No. 5,852,890 (Pynenburg). This involves a highly labor intensive production process and is not efficient in terms of use of the temporarily magnetizable material. The limit is typically the minimum metal sheet thickness that is commercially available. Applications using metal sheets are also limited by cost, and safety concerns due to sharp edges of the thin metal sheets. Also, efficiency is limited due to the fact that the permanently magnetizable materials that are to be used according to Pyenburg are not specified to any degree.

U.S. Pat. No. 4,702,700 (Taylor) proposes a book with sheets of magnetic material embedded within the pages, which attract removable magnetic pieces placed onto the surface of the page. Taylor's magnetic sheets are thick and produce a significant bulge in the pages. The bulge is esthetically unattractive, and spoils the invisible effect of the magnetism by making it obvious that there is a concealed artifice within the pages. The problem can be overcome by adding compensating fillers. Taylor's invention requires hand-assembly which is a major limitation. It is believed that the weight of the magnetic sheets used by Taylor would also be such as to restrict the number and size of the sheets that could practically be included in one book.

U.S. Pat. No. 6,159,577 (Pynenburg et al.) describes a modifiable sign system where off-the-shelf temporarily magnetizable inks are silkscreen coated at a preferred thickness of 0.025 mm over the whole surface of a plastic substrate of at least 0.25 mm thick, then 100% overcoated with ultraviolet-curable white of thickness less than 0.1 mm, then silkscreen overprinted with colored ink of thickness less than 0.1 mm. There is a great lack of efficiency in this proposal in that very thick extruded rubber magnets of thicknesses of 0.6 mm to 1.5 mm must be used with the relatively inefficient, off-the-shelf, temporarily magnetizable inks. Substrates are plastic at thicknesses of at least 0.25 mm which limits the methods by which the temporarily magnetizable surfaces can be overprinted. For example, substrates of this thickness could not be printed on a sheet offset lithographic press, or by gravure, or flexo for example. Further, in this system both the temporarily and the permanently magnetizable layers are relatively stiff. As a result, any departure from flatness may result in gaps between the two magnetic components that cannot be taken up by flexing of either component. Such gaps result in significant reduction in the magnetic load that can be supported.

U.S. Pat. No. 3,998,160 (Pearce) describes a method of printing an ink containing magnetic particles and aligning the particles magnetically prior to printing such that remanence patterns can be read by sensing heads to identify forgeries in bank notes and other security items. Pearce does not describe or suggest using magnetizable inks to magnetically support loads. Further, Pearce does not suggest combining two surfaces with magnetic printing inks or coatings such that permanently magnetized inks or coatings magnetically interact with either permanently or temporarily magnetized inks or coatings.

U.S. Pat. No. 5,525,649 (Nishimura et al) describes formulating a magnetic paint with regularly dispersed fine particles to reduce noise levels in recording analog or digital data magnetically.

U.S. Pat. No. 5,869,148 (Silverschotz et al.) describes a process for the in-line, high speed manufacturing of magnetic products where a slurry of a permanently magnetizable material suspended in a binder is applied to a substrate at thicknesses of from 0.1 mm to 0.5 mm, dried, and then permanently magnetized with a coil inductor at 10,000 Oerstedt. The pole line spacing is 1.5 mm to 2.5 mm. An SrFe concentration of 64% is indicated. For reverse-roller coating, a viscosity 300 to 5,000 cps, preferably 3,000 to 4,000 cps, is described. The coating is a continuous process on a moving web. Silverschotz's slurry is not printable, it can only be coated onto the entire surface of a substrate. Printing is understood as allowing the positioning of ink in selected areas on a substrate to form meaningful shapes and images.

U.S. Pat. No. 6,853,280 (Sugawara) describes a method of magnetizing magnetic sheets using rare Earth permanent magnet roller configuration in which sectors of a roller may be magnetized radially, so that poles are adjacent and not opposing on the outside of the roller. The magnetizing roller produces a field of 6,000 Gauss.

U.S. Pat. No. 5,942,961 (Srail et al.) describes an apparatus for permanently magnetizing magnetic sheets with rollers formed from stacks of disks. Each disk is Magnetized axially, with the poles of adjacent disks opposed to produce an effective external pole between them. Srail uses upper and lower rollers on opposite sides of the material being magnetized, with complementary magnetic pole patterns.

U.S. Pat. No. 5,843,329 (Deetz) describes a magnetic paint additive in broad terms, where a wide range of iron particle sizes are suspended within surfactants that can be added to paints. A surfactant is a wetting agent that lowers the surface tension of a liquid, allowing easier spreading, and lower the interfacial tension between two liquids. At one point, the composite magnetic paint additive is stated to contain in the order of 8,000 grams of iron powder per gallon, or about 80% iron powder by weight. Deetz claims that the additives, including the surfactant, do not increase a paint's viscosity by more than 25%. Deetz describes many ways of formulating the magnetic paint additives but does not describe the magnetic load supporting characteristics, or optimum magnetic fields, of the dried magnetic paints or coatings. Example 4 describes coated thicknesses of between 1 to 6 mils (0.02 mm to about 0.25 mm). Deetz describes the possible use of silk screening and sprays to apply magnetic paints. It appears that the silk screen is intended only to assist in controlling the thickness and uniformity of a coating, not as an image-forming printing process. Deetz describes particle size selection on the bases of the surface characteristics required of paints or coatings. Deetz describes coating between substrates. Deetz describes larger particles as yielding stronger magnetism and recommends a broad range of particle sizes. Deetz states that any type of Fe particle can be used. One Example describes a coated substrate less than 10 mils (0.25 mm) thick laminated with a second surface sheet.

U.S. Pat. No. 3,503,882 (Fitch) discloses a paint composition containing iron powder and an epoxy ester resin with an emulsifiable polyethylene wax and an organophilic alkyl ammonium bentonite dispersed in a paint hydrocarbon solvent when applied to a substrate and dried, a surface to which magnetic symbols will adhere and which will accept chalk markings. The iron powder employed was 100 to 200 mesh (0.005 to 0.01 in., or 0.125 to 0.25 mm) with over half above 200 mesh and comprising by weight about 70% to 85% iron powder to epoxy ester resin. The product was brushed on.

U.S. Pat. No. 5,587,102 (Stern et al.) discloses a magnetic latex paint composition comprising a carrier, particulate magnetically permeable material, a binder and a thickening agent having thixotropic and viscosity characteristics such that the paint composition has high viscosity when stationary, and low viscosity when subject to shear forces while being painted on a wall. Particulate iron no smaller than 350 mesh (70 μm) was employed with synthetic clay as a thickening agent to keep particles in suspension. Thus formulated, drying retarders were necessary so that the smooth surface after paint application could be achieved without lap marks.

U.S. Pat. No. 5,949,050 (Fosbenner) proposes magnetic cards containing, sandwiched within them, a shaped sheet of magnetic material that produces an image by attracting magnetic particles in a liquid imaging cell. The shaped sheets of magnetic material are set into correspondingly shaped cutouts in a filler sheet in the cards. Fosbenner suggests that "a magnetic or magnetizable ink" could be used instead of magnetic sheets, but provides little or no disclosure of how to formulate or apply such a magnetic ink. Because of the use of filler sheets, Fosbenner's cards are thick. The filler sheets also add to the bulk and weight.

My own earlier U.S. Pat. No. 7,192,628 (Burrows '628) describes spot printing magnetizable inks that are thin enough to be compressed into a thin card substrate, so that they can be directly offset overprinted, and yet still magnetically support useful loads. The highest efficiency measured based on Burrows, for one permanently magnetized layer and one temporarily magnetized layer, is in the order of a combined thickness of 0.7 mm to support loads of almost 0.4 grams per square centimeter using multi-polar fields.

Burrows '628 describes in an Example a permanently magnetizable ink based on 79% of commercially available strontium ferrite with a nominal particle size of 2 μm±0.5 μm, in a styrene-butadiene carrier thinned with mineral spirits. In practice, that ink when formulated with available ingredients was found to have a very high viscosity, over 50,000 cps. The high viscosity renders that ink slow and difficult to print with, and tending to clog the printing machinery. Although that ink has been used commercially, it left room for further improvement.

The magnetically soft iron inks in Burrows '628 use much larger particles, around 50 microns, to improve the magnetic properties. The large particles compel a comparatively thick ink layer, to contain the large particles, and cause the ink layer to have a surface too rough for direct high-quality printing. Further, the "double scrubbing" process specified for the Fe particles in Burrows '628 is a process of wet pressing and grinding. Pressing creates agglomerated particles with high surface porosity, and thus high surface area. Grinding creates jagged particles with high surface area.

SUMMARY OF THE INVENTION

According to an embodiment of the present invention, there is provided a magnetizable ink comprising magnetizable particles having a modal diameter between 3 μm and 10 μm and a surface area less than 50,000 $cm^2$ per $cm^3$.

According to another embodiment of the present invention, there is provided a magnetizable ink comprising at least 70% by weight rounded or sintered particles, or both, of magnetizable material having a modal diameter between 3 μm and 10 μm, with 0% above 18 micron and not greater than 20% by number under 0.5 micron.

According to a further embodiment of the present invention, there is provided a magnetizable ink comprising at least 65% by weight of magnetizable particles having a modal diameter between 3 μm and 10 μm and having a viscosity less than 16,000 cps when ready to print.

Aspects of the present invention are directed to formulating, printing, and magnetizing layers of magnetic load supporting, temporarily and permanently magnetizable, inks with higher efficiencies than have previously been available, and in which material usage can be significantly reduced. Aspects of the present invention are directed to magnetic load supporting inks that have a significantly increased ratio of "Magnetic Load Support" to "Magnetizable Layer Thickness," in the order of at least 1 gram per square centimeter with paired ink layers having a combined ink thickness under 400 micron. Aspects of the present invention are directed to printing magnetizable inks with tight registration to align with directly overprinted high resolution images printed by sheet offset, gravure, flexo, ink jet, laser, and other types of printing machine with images with resolutions from 90 LPI to 150 LPI and above, at the interface, without requiring compression of the ink and with a significantly increased ratio of "Magnetic Load Support" to "Magnetizable Layer Thickness."

The present application is based in part on the realization by the inventor that the magnetic load supporting characteristics of known magnetizable inks, and coatings, are limited at least in part by the density, crystal alignment, and surface area of the magnetizable materials that are suspended within them, or can be suspended within them and yet remain plastic and durable; by the distance between magnetically attractive layers when covered with printed images and indicia on the adjacent magnetically attractive surfaces; by the strength of a magnetic field that can be induced per sq. cm. uniformly over a surface area of an indefinite size; by the weight of the magnetizable layers; by the stiffness of the substrates supporting the magnetizable layers where any surface deviation significantly reduces the magnetic load supporting characteristics; by the methods used to print or laminate images, desirably full color high resolution images, over the magnetizable layers.

Aspects of the present invention are directed to formulating, printing, and magnetizing layers of magnetic load supporting, temporarily and permanently magnetizable, inks on thin and flexible substrates that flex (fold up to 180 degrees without the ink fragmenting) and that flex to produce at least 75% contact and up to almost 100% contact in spite of departures from flatness of the mating magnetic surfaces. One or both of the temporarily or permanently magnetizable or magnetized ink layers may be a flexible ink layer printed on a flexible substrate. If only one ink layer is on a flexible substrate, that may be the temporarily magnetizable layer, because that is typically the thinner layer. The flexibility is desirably sufficient that under the action of magnetic attraction when the two layers are placed together, the flexible substrate, with its magnetizable layer, can deflect sufficiently to accommodate initial deformities in either layer and increase to a substantial extent the contact area between the two substrates, and therefore the magnetic force available for load support.

A pair of permanently magnetizable, spot printed ink layers of combined thickness under 400 micron may support magnetic loads of over 1 gram per square cm. In one example, it is possible to formulate a pair of layers, comprising a 50 micron thick temporarily magnetizable Fe ink printed on a flexible substrate and a 250 micron thick permanently magnetizable SrFe ink or extruded SrFe layer, that will support, with a multi-polar field, at least 1 gram per square cm, and 1.5 grams per square cm, or even more, is believed to be achievable.

In an example, the inks are printed in thin layers for direct overprinting and, if spot printed, are printed at a thickness of 50 micron or less. In an example a pair of these inks have a combined thickness of less than 400 micron.

Embodiments of the invention impose novel constraints on: (i) magnetizable particulate density in addition to the percentage of particles suspended in a formulated ink; (ii) magnetizable particle purity; (iii) particulate surface area; (iv) the crystalline structure of the magnetizable particles; (v) ink base formulations that can accommodate high percentages of hard and soft magnetic particles, such as iron or other ferrite particles, while remaining fluid when wet and flexible when dry; (vi) the flexibility of substrates upon which the said magnetizable inks are printed; (vii) methods and devices to induce multi-pole high Gauss magnetic fields in, for example, ink thicknesses of 0.03 mm to 0.1 mm or 0.03 mm to 0.15 mm in temporarily magnetizable inks, and in ink thicknesses of 0.1 mm to 0.3 mm or 0.2 mm to 0.3 mm in permanently magnetizable inks.

Direct overprinting of indicia and images, in resolutions of 90 lines per inch (LPI) to 150 LPI (3.5 to 6 lines per mm), onto magnetizable ink layers is desirable in that magnetizable layers are then not separated by the thickness of paper or card printed with indicia or images that might be laminated to the magnetizable ink surfaces. Direct overprinting reduces the distance between magnetically attractive layers and increases the ratio of Magnetic Load Support to Magnetizable Layer Thickness. Aspects of the present invention provide magnetic layers that facilitate such direct overprinting. The thickness of spot printed, temporarily magnetizable, inks of 50 micron, or less, is significant in that inks of that thickness, and less, can, without compression, be directly overprinted by sheet offset lithography, without interruption at the edges of the printed temporarily magnetizable inks. Thicker ink layers may produce a step that interrupts the overprinting if special measures, such as the indentation described in Burrows '628 or overcoating with a filler material, are not taken.

If particle sizes are in the order of 10 micron or less then overprinted offset lithographic images can be printed with a resolution of 150 LPI. 150 LPI (300 dots per inch, 12 dots per mm) is a reasonable minimum resolution for high-quality printed matter to be viewed by the unaided human eye. The applicant has found that particle sizes coarser than 10 micron tend to produce a rough surface that visibly degrades printing at 150 LPI. Before printing the images, the magnetizable ink may be overprinted with white or other ground color to improve smoothness, smooth out any step at the edges of any spot-printed areas of magnetizable ink, or cover over the naturally dark color of the magnetizable inks, or for more than one of those reasons.

The smooth surface produced by using particle sizes no coarser than 10 micron can also be covered with a thin laminate such that the surface of the laminate is smooth to the naked eye over spot printed areas of the magnetizable ink, and smooth for magnetic interaction, such that magnetically attached objects can be moved over the surface on an even plane.

The temporarily or permanently magnetizable ink, or both, may be printed on a substrate that is printed with indicia and images on the side opposite the magnetizable ink instead of, or in addition to, on the side bearing the magnetizable ink.

The overall greater efficiency of inks formulated according to embodiments of the invention has many advantages. Thinner magnetizable inks can print on thinner substrates, which immediately reduces material usage, increases production options for the methods of printing, reduces drying times, increases production speeds, and significantly reduces the overall weight of the magnetizable layers. For example, paper or thin film can be printed or coated and yet still magnetically support useful loads.

Thin and very flexible magnetizable inks applied to thin, flexible substrates that are the subject of embodiments of the invention are also advantageous because the magnetizable surfaces can draw each other into contact even when one or both of the layers is initially bent or distorted. Any space between paired layers tends to reduce the magnetic field strength by the square of the separation, so increasing the proportion of contact can significantly increase the load-bearing capacity of the pair of layers.

Magnetic field patterns may be induced in the permanently magnetized ink layer to encode data in analog or digital form that is used to trigger responses in one or more magnetically attached electronic devices.

One aspect of the invention provides a magnetic inducer comprising an array of rods permanently magnetized along their lengths and positioned side by side, the array comprising a contact face defined in part by one end of each said rod to be operatively contacted with a surface to be magnetized.

The said one ends defining the contact face may form a regular array of north and south magnetic poles. The magnetic inducer may further comprise rods of magnetically soft material between the permanently magnetized rods.

According to another embodiment of the invention, magnetization may be induced in a permanently magnetizable ink layer by a neodymium grid Inducer consisting of individual pole surfaces positioned with alternating poles in a square grid arrangement. The pole surfaces may be the ends of neodymium cylinders. Iron cores may then be positioned in the spaces between the cylinders and serve to focus the magnetic fields. The pole surfaces may be in hexagonal or semi-regular tessellating arrangements.

The pole surfaces can also be positioned at different angles and curves to magnetize irregular surfaces.

BRIEF DESCRIPTION OF THE DRAWINGS

The above and other aspects, features and advantages of the present invention will be apparent from the following more particular description thereof, presented in conjunction with the following drawings wherein.

DETAILED DESCRIPTION

A better understanding of various features and advantages of the present invention may be obtained by reference to the following detailed description of embodiments of the invention and accompanying drawings, which set forth illustrative embodiments in which various principles of the invention are utilized.

Referring to the accompanying drawings, embodiments of methods, inks, and printed products according to the invention involve the formulation of inks that remain plastic with a particularly high density of pure Fe (or other soft ferrite particle) or SrFe (or other hard ferrite particle) with highly regular crystalline structures. These embodiments are dependent upon the surface area of the particles used and the impact that particulate surface area has on the viscosity and corresponding printability of magnetizable inks or coatings formulated. Embodiments of these methods are dependent upon magnetic fields with multiple poles, in various configurations, where bipolar magnetic fields, though useful, have limited areas of magnetic attachment and therefore exert magnetic loads that can overly stress thin substrates printed with magnetizable inks. Embodiments also make use of the flexibility of the substrates onto which magnetizable inks are printed such that paired layers of permanent to permanent, or permanent to temporary, magnetizable inks can draw into close contact when the layers are initially bent or otherwise irregular.

Significant factors are particle purity, crystalline integrity, particle surface area, particle size, size distribution, and domain alignment and ink bases that are formulated to remain plastic and flexible with particles of comparatively high surface area, proximity of high resolution images with magnetizable ink surface, substrates that can be printed on that remain flexible after printing, and the means to induce the maximum possible permanent magnetic fields within comparatively thin ink or coating layers. Print rate and dry time are also key in determining optimal formulations.

Magnetizable Particles

Particle Size, Shape and Ink Viscosity.

To find optimum magnetizable particle types that can be suspended in ink, or coating vehicles, such that the printed and dried, or cured, magnetizable inks remain plastic, and where the formulated magnetizable inks support a high ratio of magnetic field strength to magnetic ink, or coating, thickness has involved research into many types of magnetizable particle, plastic ink vehicles, and various configurations of magnetic field inducer. For applications with two thin magnetizable ink layers, magnetically interacting with each other, at least one of the layers must be permanently magnetized. In these embodiments, the permanently magnetized ink layer consists of a hard ferrite and an ink base and the temporarily magnetizable ink layer consists of a soft ferrite and an ink base. Soft ferrite particles, such as iron (Fe), by size, typically have a significantly lower surface area than hard ferrite particles, such as strontium ferrite, such as $SrFe_{12}O_{19}$ particles. Strontium ferrites are referred to herein by the abbreviation "SrFe." This is primarily due to the shape of the crystals, where Fe crystals are generally of a cubic structure, and tend to a compact shape, and SrFe crystals are flat hexagonal crystals and tend to a less compact shape.

Figure 7:
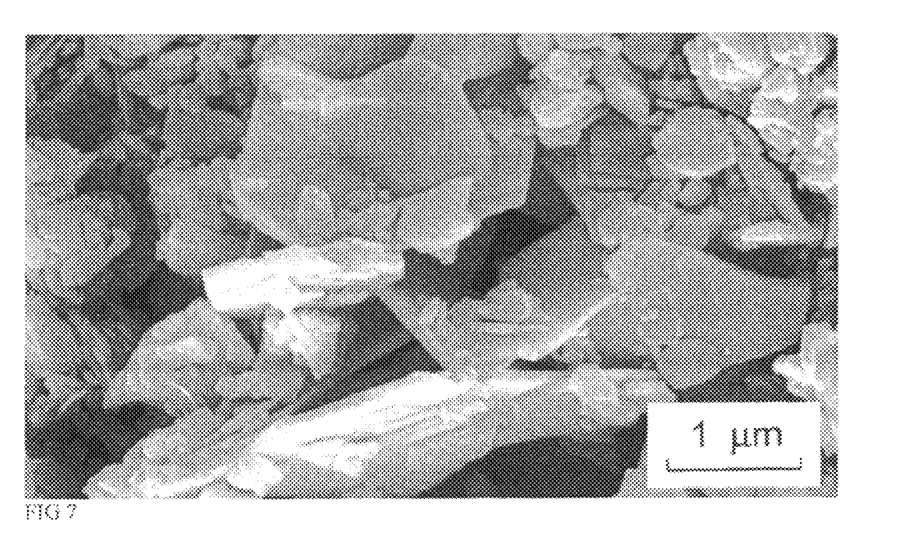
FIG. 7 shows SrFe particles of 1 Micron size.

So for a given crystalline volume, in very general terms, SrFe particles can have surface areas that are factors of ten, or more, times greater than Fe particles. FIG. 7 is a micrograph of typical SrFe particles, showing the flat shape of the individual crystals, and the resulting jagged, porous shape of the particles. Size also greatly impacts the total particulate surface area. For example, particles with an average size of 3 micron have twenty times the surface area per unit volume of particles of the same shape with an average 60 micron diameter.

The applicant does not have available any reliable method of accurately directly measuring the surface area per unit volume of arbitrary particles. The figures provided in this specification are therefore largely based on modeling using a variety of shapes, including close-packed spheres, stellated polyhedra, and hexagonal prisms. Stellated polyhedron models have proved reliable for fractured particles, and hexagonal prism models have proved reliable for sintered hexagonal models. The reliability of the models can be assessed with some confidence by studying the variation of viscosity in dependence on particle size and particle size distribution.

Figure 3:
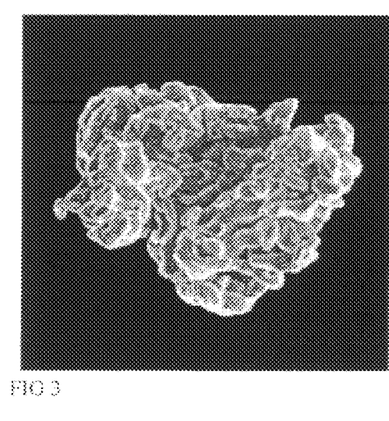
FIG. 3 shows Fe particles of 5 micron size produced by mechanical reduction.
Figure 4:
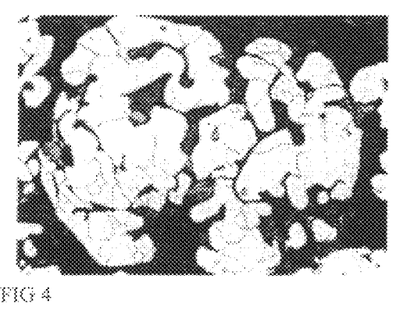
FIG. 4 shows Fe particles similar to those in FIG. 3 in cross section.
Figure 5:
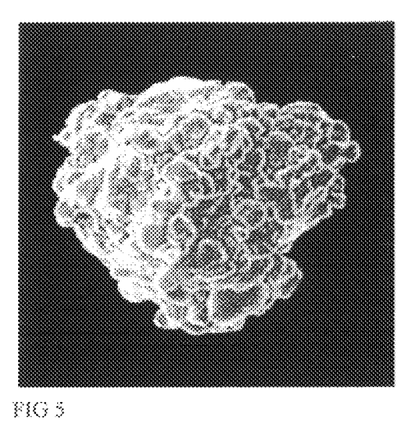
FIG. 5 shows Fe particles of 5 micron size produced by Gas Atomization.
Figure 6:
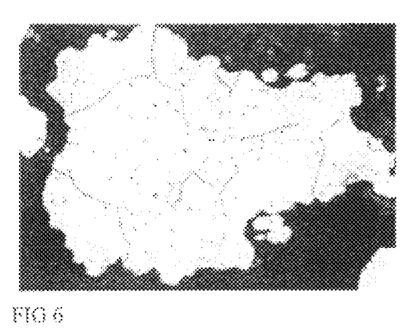
FIG. 6 shows Fe particles similar to those in FIG. 5 in cross section.

Particulate surface area also depends upon the purity of the crystalline structure and the amount of fracturing resulting from the means of manufacture. FIGS. 3 and 4 show an external micrograph and a cross section of Fe particles formed by reduction. Particles formed by mechanical reduction are not ideal, because the reduction process fractures the crystalline structure, reducing the magnetic properties of the particles. FIGS. 5 and 6 show an external micrograph and a cross section of Fe particles formed by atomization. The reduced particles have a visibly higher porosity and higher surface area than the atomized particles. Particulate surface area is significant in that particles with higher surface area increase the viscosity of the ink. For example, one example of a magnetizable ink with 20% acrylic resin base and 80% of a 5 micron rounded Fe particle has a viscosity of 17000 cps. An ink with 20% of the same acrylic base and 80% of a similarly rounded 100 micron particle has a viscosity of 11020 cps. An ink with 36% of the same acrylic base with 64% of a 1 micron SrFe particle has a viscosity of over 300,000 cps, even though the lower solid particle content would be expected to reduce the viscosity significantly.

Figure 1:
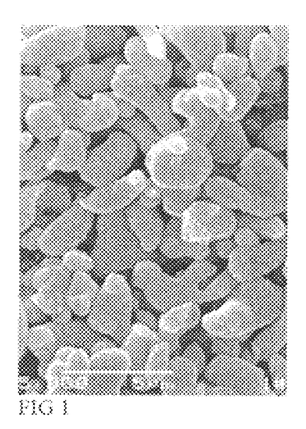
FIG. 1 shows Fe particles of 5 micron size produced by chemical distillation.
Figure 2:
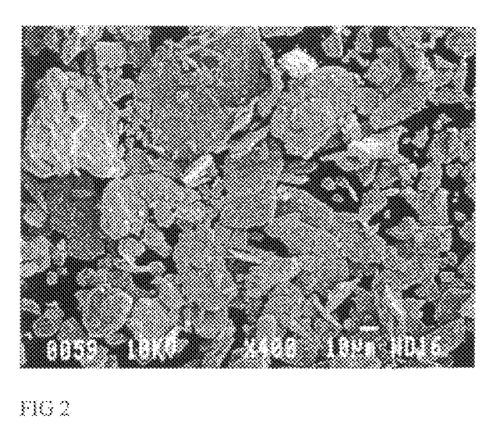
FIG. 2 shows Fe Particles of 10 Micron size produced by Electrolysis.

These examples are not proportional due to a number of factors, but particularly because of surface irregularities caused by the means of production. FIG. 1 shows chemically distilled Fe particles, which have a very smooth, rounded shape. FIG. 5 shows Fe particles produced by atomization, which are less rounded. FIG. 3 shows Fe particles produced by reduction, which are still less rounded. FIG. 7 shows SrFe particles, with a characteristically jagged shape. FIG. 2 shows Fe particles produced electrolytically, which are even more irregular than the SrFe particles. For the ink base used in this example, and for fully automated high-speed silkscreen printing at 1,000 sheets per hour, the viscosity may be in the range of 5,000 cps to 25,000 cps, and a viscosity less than 15,000 cps is optimal, so particles with comparatively higher surface areas create significant printing problems due to high viscosities. For rotary silk-screening, the preferred viscosity range is 800 to 1,200 cps, and for silk-screening of ultraviolet-curable inks, the preferred viscosity range is 4,000 to 5,000 cps.

Thus, rounded Fe particles of the shape shown in FIG. 1, with maximum sizes of 3 micron and above, and possibly 1 micron and above, mixed at 80% Fe, 20% carrier base, with ink bases herein described, can be printed at a commercial rate, for example 600 to 1000 sheets per hour on a fully automatic silkscreen machine. Inks mixed with SrFe particles of the shape shown in FIG. 7, with maximum particle sizes of 1 micron, generally have viscosities that are unprintable at over 65% SrFe particles, due their high surface areas. The SrFe materials hitherto commercially available typically have a particle size of 1 micron or less, because they are intended for magnetic sound and data recording devices, for which finer particles allow higher data densities, and application is by coating rather than printing. Low viscosity, or more plastic, ink bases can compensate, but, in general, larger SrFe particles are needed for cost effective printable inks.

A further advantage of the chemically distilled particles shown in FIG. 1 is their very uniform size range, with 5 micron nominal size particles having d10 0.8 micron—d50 5 micron, d90 10 micron (that is to say: 10% of the particles by number are smaller than 0.8 micron; 50% of the particles by number are smaller than 5 micron; 90% of the particles by number are smaller than 10 micron. This is beneficial because a high fraction of very small particles would increase the area per unit volume, and thus the viscosity of the ink; while large particles would impair the printability of the magnetizable ink surface.

Two samples of chemically distilled Fe particles had the following properties:

TABLE 1

|  | Sample 1 | Sample 2 |
| --- | --- | --- |
| Iron | >98.5% | >99.0% |
| Carbon | <0.028 | <0.028 |
| Nitrogen | <0.01 | <0.01 |
| Oxygen | <0.6 | <0.5 |
| ParticleSize Distribution | | |
| d10 | 0.8 μm | 1.0 μm |
| d50 | 3.0 μm | 5.0 μm |
| d90 | 5.0 μm | 10.0 μm |
| Apparent Density | 1.7 g/cc | 2.2 g/cc |
| Tap Density | 2.2 g/cc | 4.13 g/cc |
| Sintered Density |  | 7.60 g/cc |

For a plastisol ink base, a 65% SrFe particle sized at 4 to 6 micron is printable but the lower viscosity of the ink base itself, i.e. without the SrFe, is in the order of 600 cps, which can result in fracturing of the dried printed ink. This can be overcome by using a fibrous substrate where the substrate itself integrates with the ink to reduce and even eliminate fracturing but it is not ideal due to the limitation of the substrates and the fact the fiber dilutes the particle density. A more plastic styrene butadiene formulation supports 65% of 1 micron SrFe particles but the resulting mixture has such a high viscosity, at over 250,000 cps, that the ink is not commercially viable for high volume print production. The viscosity would be workable as a coating on a magnetic storage device, but not for printing techniques such as silkscreen, gravure or flexo, used to produce smooth spot printed areas with a uniform thickness.

Thus, for SrFe the minimum particle size for a printable ink has been found to be 3 to 6 micron, or above, and up to 60 micron depending upon the general shape of the particle and how rounded or irregular it is. However, there is a trade between particle size and packing density and thereby induced magnetic field strength and the descriptions of ideal formulas take this into account. Another limiting factor is the resolution of direct lithographic overprinting where the particle size limit is under 10 micron for resolutions of 300 dpi (12 dots per mm), because larger particles can produce a rough surface that visibly degrades the printed image.

Particle Size, Crystal Structure and Domain Alignment

The inventor has determined that Fe particles manufactured by liquid sedimentation, or atomization, have fairly high apparent densities in the range of 2.3 gram/cubic centimeter and up to 4.6, or higher. (The density of solid Fe is 7.87.) the inventor also found, through testing, that a level of sintering dramatically increases the potential magnetic field strength. The size of particles produced by gas atomization appears to be rather limited, and particles cannot readily be produced much smaller than 20 micron. On the other hand, chemical distillation produces particles with a maximum size of from 1 to 5 micron, which can be sintered up in particle size. Research into the structural properties of magnetic nanoparticles, ref. Darko Makovec, et al., supports the findings in that the crystalline structure is improved by a level of temperature over time sufficient to promote sintering. See also research by Neal Myers and Raman Baijal of Pennsylvania State University Center for Innovative Sintered Products, and Patrick King of Hoeganaes Corporation, Cinnaminson, N.J.: Myers et al., *Sintering of PIM Fe-2Ni-0.8C*, presented at PM2Tech2004, Chicago, Ill., Jun. 13-17, 2004.

The present inventor has studied particle sizes above 1 micron and below 60 micron and also sintered particles with sizes increased from maximum particle size of 1 micron to 5 and 10 microns. Fe particle sizes under 1 micron have too great a surface area, by proportion, making ink formulations too viscous for practical printing, even with rounded particles. Fe particles under 1 micron are also too expensive for the applications herein envisioned. In fact 3 to 6 microns is presently believed to be optimal if Fe particle surfaces are rounded and therefore with a comparatively small surface area per volume, as shown in FIG. 1. Fe particles in the range of up to 10 microns result in magnetizable ink surfaces that are smooth enough not to fragment indicia that might be directly overprinted by a sheet offset lithographic press, or web press, or with any printing apparatus with resolutions in the order of 300 dpi. Fe particle sizes above 10 microns start to disrupt the resolution of overprinted 300 dpi images and are more suitable for products in which a cover layer is laminated over the magnetic layer, or where printing at a coarser resolution is acceptable.

Fe particles produced by liquid sedimentation and atomization are generally rounded-irregular with relatively smooth surfaces unlike mechanically reduced iron powders that can have extremely rough surfaces and a disproportionately high surface areas. Fe particles of sizes between 5 and 10 micron have greater anisotropic properties if manufactured by chemical distillation and some sintering. Gas or water atomization particle size appears to be more limited and not much smaller than 20 micron whereas chemical distillation produces particles at a maximum from 1 to 5 micron, and which can be sintered up in particle size. The amount of sintering—by time and heat—dramatically improves the magnetic load supporting characteristics of the ink. This improvement is evident in the sintered density that can double or triple the tap density but also in a marked increase in the regularity of the crystal structure of magnetizable particles. Particle size is also linked to oxidation levels. Fe particles smaller than 10 micron tend to oxidize at a higher rate almost proportionately to size. This places constraints on production whereby particles need to be overprinted or over-coated within 3 to 6 hours of production. For high resolution printing where a white ground coat is over-printed onto the magnetic layer before the image printing, the ground coat may be formulated to reduce oxidation of the Fe layer.

Optimum Fe powders have a maximum particle size under 10 micron and a high percentage, 50% and above, over 3 micron. Ideal particles have a low surface area and, compositionally, are dense, and pure. Known commercially available Fe powders come fairly close to optimum, particularly powders manufactured by chemical distillation, gas atomization, and electrolysis.

Optimum SrFe powders have a maximum particle size under 10 micron and a high percentage, 50% and above, over 3 micron. Ideal particles have a low surface area and, compositionally, are anisotropic, dense, and pure. Known commercially available SrFe powders do not have the optimum properties and compromises have to be made. However, new manufacturing methods are being investigated, although for different applications, particularly in the nano-particle arena that there are signs that more efficient particle types will be found in the future. For example, see A. A. Fargalil, et al., *Phase and conductivity dynamics of strontium hexaferrite nanocrystals in a hydrogen gas flow*, International Journal of Physical Sciences, Vol. 3 (5), pp. 131-139, May, 2008, available online at http://www.academicjournals.org/IJPS.

Although in Fargalil et al. the development is of nanocrystals of SrFe, the shape, purity and crystal integrity are applicable to the present inks, and the inventor believes that with additional sintering particles between 3 micron and 10 micron might be produced. Jiye Fang et al., *Fine Strontium Ferrite Powders from an Ethanol Based Microemulsion*, Journal of the American Ceramic Society, Vol. 83, Issue 5, pp. 1049-1055, published online: 21 Dec. 2004, shows the impact of higher calcination temperatures on reducing surface areas of particles, see FIG. 8 of that paper.

SrFe powders that would come close to the optimum available with current production methods would be sintered anisotropic powders sized 3 to 6 micron with particulate densities in the order of 4.9 grams per cubic centimeter, Br values of 410-430 Tesla, with coercivity in the range of 283 to 307 KA/m. However, no commercially available particles in this range have been found that have been sintered to that size. All the commercially available particles have been reduced from larger sizes by wet or dry pressing. That results in jagged shapes with high surface areas. The high surface area of commercially available particles limits the % of SrFe particles that can be suspended in an ink without the ink becoming too viscous to be printable. The low maximum particle content necessitates a thicker ink layer to magnetically support a useful load. The thicker ink layer makes it more difficult for the ink to remain usefully plastic after drying when printed on flexible substrates. In formulations developed to date the maximum SrFe percentage achieved in an ink base is 70% wet, and 70% to 74% dry, whereas using particles of the same size the maximum Fe percentage is from 80% to 84% dry, and the Fe inks remain plastic after drying.

Different SrFe powders were tested. Powders manufactured by milling crystallite agglomerates of magnetic hexaferrites, manufactured by pre-sintering (1100 to 1300° C.) strontium carbonate and iron oxide, to about 1 micron had a broad size distribution and crystal defects. Heating or sintering up to an average particle size of 5 micron improved the particle characteristics. The increase in size proportionately reduced surface area. Hcb (coercive) values increased from about 200 kA/m to about 307 kA/m. Br (flux density) values increased from about 390 mT to 450 mT.

Table 2 shows the properties of some samples of SrFe materials obtained from commercial suppliers.

TABLE 2

| | SrFe anisotropic | | | | |
|---|---|---|---|---|---|
| Size/μm | 3-6 | 3-6 | 3-6 | 3-6 | 3-6 |
| Pressing method | wet | wet | wet | wet | wet |
| Heating/Sintering | heat/sinter | heat/sinter | heat/sinter | heat/sinter | heat/sinter |
| Density g/cm$^3$ | 4.8 | 4.8 | 4.8 | 4.8 | 4.8 |
| Br (mT) | 380-410 | 390-410 | 370-390 | 370-390 | 370-390 |
| Hcb (KA/m) | 175-215 | 239-271 | 263-291 | 279-299 | 279-303 |
| Hcj (KA/m) | 183-231 | 247-275 | 307-330 | 342-378 | 382-406 |
| BH max (KJm3) | 25.8-28.7 | 27.1-30.3 | 28.8-31.8 | 25.8-28.7 | 26.0-29.2 |
| Size/μm | 3-6 | 3-6 | 3-6 | 3-6 | 3-6 |
| Pressing method | wet | | | | |
| Heating/Sintering | heat/sinter | heat/sinter | heat/sinter | heat/sinter | heat/sinter |
| density g/cm$^3$ | 4.9 | 4.9 | 4.9 | 4.9 | 4.9 |
| Br (mT) | 395-410 | 400-420 | 415-435 | 410-430 | 430-450 |

TABLE 2-continued

SrFe anisotropic

| Hcb (KA/m) | 271-300 | 215-239 | 215-239 | 283-307 | 247-271 |
|---|---|---|---|---|---|
| Hcj (KA/m) | 307-326 | 219-243 | 219-243 | 307-330 | 251-275 |
| BH max (KJm3) | 29.6-32.8 | 29.6-32.8 | 31.2-34.4 | 32.0-35.2 | 35.2-38.4 |
| Method | milled | milled | milled | milled | milled |
| Size/μm | 1.1-1.4 | 1.5-1.8 | 1.8-2.1 | 1.3-1.6 | 1.3-1.6 |
| Br (mT) | 180-175 | 180-175 | 180-175 | 250-240 | 245-235 |
| Hcb (KA/m) | 119-115 | 111-107 | 111-107 | 167-159 | 159-151 |
| Hcj (KA/m) | 183-167 | 159-143 | 159-143 | 223-199 | 223-215 |
| BH max (KJm3) | 5.97-5.57 | 5.57-5.17 | 5.57-5.17 | 11.9-11.1 | |
| Method | milled | milled | heat/sinter | heat/sinter | heat/sinter |
| Size/μm | 0.5 | 0.5 | 0.5 | 0.5 | 3-6 μm |
| Br (mT) | 210-215 | 230-235 | 390-395 | 400-405 | 410-415 |
| Hcb (KA/m) | 150-154 | 155-159 | 235-239 | 191-195 | 223-227 |
| Hcj (KA/m) | 350-354 | 278-282 | 239-243 | 199-207 | 230-233 |
| BH max (KJm3) | 9-9.4 | 9.6-10 | 28-28.1 | 29.2-31.2 | 22.8-31.7 |

Ink Base

An objective of the present embodiments is to formulate magnetizable inks that can be printed on substrates with smooth surfaces and at thicknesses that can be directly offset overprinted and that will remain fully plastic after printing and have useful magnetic load supporting properties. In general, "fully plastic" means that a printed and dried ink can be folded 180 degrees without fragmenting.

Fe Ink Base

There are a number of ink formulations that will accommodate from 80% to 84%, dry, of a 5 micron, maximum size, rounded Fe particle, manufactured by liquid sedimentation, as shown in FIG. 1, where the ink formulation will inhibit oxidation of the Fe. These Fe particles can have a high crystal integrity with a tap density of 4.2 grams per cubic centimeter unsintered, and a sintered density of 7.6 grams per cubic centimeter. The rounded shape shown in FIG. 1 has a comparatively low surface area and can be described as a rounded irregular particle of high purity at 98.5% with a particle size distribution of: d10 0.8 micron; d50 3.0 micron; d90 5 micron. The comparatively low surface area and high density results in lower viscosity inks that can be printed with higher levels of Fe crystals, thereby significantly increasing the ratio of magnetic load support to ink thickness. As technology improves even smoother, more rounded particles, with even higher crystalline integrity and purity will become commercially available, further increasing this ratio.

The following examples illustrate ink bases or vehicles suitable for use with the Fe particles;

Example 1

An ink base has the following ingredients:
acrylic resin (a polymer of methyl methacrylate and butyl methacrylate) 33 to 38%;
diacetone alcohol (solvent) 52 to 62%;
additives:
  Silicone defoamer 1 to 4%;
  Silicon dioxide 2 to 6%;
  Chlorinated Polyolefin 1 to 4%.
The ink base has a viscosity of 1182 cps.

Example 2

An ink base has the following ingredients:
vinyl acetate copolymer 35% to 40%;
2,2,4-trimethyl-1,3-pentanediol diisobutyrate (plasticizer) 50%;
salt of tall oil fatty acid (anti-oxidation additive) 4%;
silicone in aliphatic petroleum distillates (defoamer) 3%;
isothaniazol (preservative) 2%.

Example 3

UV-curable formulation inks are limited to thicknesses no greater than about 30 micron because the Fe particle opacity limits the penetration of UV light at the intensities required for adequate curing. A UV-curable ink was formulated as follows:
aliphatic urethane diacrylate oligomer (Ebecryl 270, Cytec, USA) 57%;
1,6-hexanediol diacrylate (Miramer M200, Miwon, S. Korea) (reactive diluent monomer) 38%;
2-hydroxy-2-methyl-1-phenyl-propan-1-one (MicureHP-8 Miwon, S. Korea) (photoinitiator) 5%.

The uncured ink base had a viscosity of 480 cps at 25 degrees C.

Printing equipment suitable for use with the present Fe magnetizable inks including a fully automatic silkscreen press, with a production rate of 700 40"×28" (100 cm×710 cm) sheets per hour may be used with solvent based or water based ink formulations requiring evaporation drying, or with UV-curable formulations. Ink thicknesses may be from 300 micron down to 20 micron. Gravure, Flexo, and 3-pass to 4-pass offset lithographic presses may also be used, especially with UV-curable ink formulations. Ink thicknesses may be from 30 micron down to 10 micron.

SrFe Ink Base

Formulating an ink that will accommodate a high percentage of SrFe and will remain fully plastic, folding or bending to 180 degrees without fragmenting, is more challenging, due to the relatively high surface areas of commercially available SrFe particles. The most effective, commercially available, SrFe particle commercially available is manufactured with some mechanical reduction followed by some sintering which increases surface area and marginally improves the crystalline structure. Although stock production reduces the particle size to below 1 micron, the manufacturers will supply larger particle sizes to special order. Indeed, since the larger particle sizes are produced by omitting the final stages of the mechanical reduction, SrFe particles in the desired 3 to 6 micron size range are obtainable at a surprisingly reasonable price.

The most effective hard ferrite particle commercially sourced, although it is not optimum, has a size of 3 to 6 micron with particulate density in the order of 4.9 grams per cubic centimeter, Br values of 410-430 Tesla, with coercivity in the range of 283 to 307 KA/m. The particle can be described as jagged and irregular. Two formulations that have been tested, and that support 60% to 70% of the 3 to 6% SrFe particle and that remain plastic (180 degrees fold without fragmenting) after printing, are Plastisol based and Styrene-Butadiene based. A broader range of ink bases will become viable if and when rounded SrFe particles with lower surface area become available. An ideal SrFe particle size range would be in the range of 6 to 10 micron with a rounded shape and minimum surface area. The inventor believes that a suitable material could be manufactured with some sintering to increase crystal formation and with little or no mechanical reduction. Such a particle would have a high level of purity 99%, and be anisotropic.

The following examples illustrate ink bases suitable for use with SrFe particles:

Example 4

A plastisol ink base with the following ingredients:
thermoplastic polymer, e.g. copolymer of styrene and maleic anhydride (SMA—Sartomer) 23%;
liquid reactive plasticizer, e.g. an epoxy resin (Epon 828—Shell) 67%;
optionally and preferably a thermal curing agent for the plasticizer e.g. dicyandiamide;
Viscosity reducer (Plus 9000—Union Ink, USA) 10% to 15%.

Example 5

An SBC ink base with the following ingredients:
Styrene Butadiene Copolymer (Low melting point K-Resin—Chevron Philips) 45%, Kerosene 65%.

Example 6

An acrylic resin ink base with the following ingredients:
acrylic resin (a polymer of methacrylate and butyl methacrylate) 33 to 38%;
diacetone alcohol (solvent) 52 to 62%;
additives:
  silicone defoamer 1 to 4%;
  silicone dioxide 2 to 6%;
  chlorinated polyolefin 1 to 4%).

The plastisol ink of Example 4 may be printed with a fully automatic silkscreen with a production rate of 600—40"×28" sheets per hour. The ink is then heat cured at 315 degrees Fahrenheit (160° C.) for from 60 seconds to 120 seconds. Ink thicknesses up to 300 micron can be applied. Silkscreen mesh 36T with photo-resist stencil at 250 micron to 300 micron is used.

The SBC ink of Example 5 automatic silkscreen with a production rate of 300—40"×28" sheets per hour. Silkscreen mesh 36T with photo-resist stencil at 100 micron to 300 micron may be used.

The acrylic resin ink of Example 6 may be printed with a fully automatic silkscreen with a production rate of 500—40"×28" sheets per hour. Silkscreen mesh 36T with photo-resist stencil at 100 micron to 150 micron may be used. Gravure and Flexo are optional methods with 3 to 4 passes to build up the ink thickness.

Where a white overprint is desired, the following may be used:

Example 7

Vinyl Resin 10 to 15%;
Epoxy Resin 1 to 3%;
Titanium Dioxide (pigment) as needed;
Diacetone Alcohol (solvent) 10 to 15% and
Isophorone (solvent) 18 to 23%;
Silicone Defoamer 1 to 2%;
Silicone Dioxide 1 to 2%.

The white layer may be printed by silkscreen mesh 43T.

Example 8

UV-curable white. A wide selection of suitable inks are commercially available. If the white layer is offset printed, then typically 4 passes may be needed to build opacity.

On magnetizable ink surfaces with particle sizes under 10 micron and magnetizable ink thicknesses under 40 micron, magnetizable inks can be directly offset-lithographically overprinted with images and indicia. It is possible to print over the edges of spot printed magnetizable areas without interruption. That may also be possible with magnetizable ink thicknesses in the range of 40 to 80 micron or even more, depending on the specific lithographic press and material being printed. Thicknesses up to 250 micron with particle sizes under 10 micron can be directly offset-litho overprinted with images and indicia if the offset lithographic images lie within the areas of spot printed magnetizable areas, so that the edges of the magnetizable ink do not interfere with the printing. If the magnetizable ink layer is too thick for direct printing over the edges of spot printed magnetizable ink areas, a white layer may be applied in such a manner as to fill in the step, and convert it to a slope that the lithographic printer can print on cleanly. The nominal thickness of the white layer for this purpose is similar to the thickness of the magnetizable ink layer, which limits the applicability of this approach for very thick magnetizable ink layers.

It is presently believed that the optimum combination is a permanently magnetized SrFe layer around 200 microns thick, with a maximum of 250 microns, paired with a soft iron layer around 50 microns thick, with a maximum of 100 microns thick. Thus, the soft iron component can usually be directly litho-printed without reference to the positioning of spot-printed magnetizable, ink, but the hard ferrite component often cannot, unless the printed matter is artfully designed to avoid the edges of the spot printed magnetizable areas.

Figure 8:
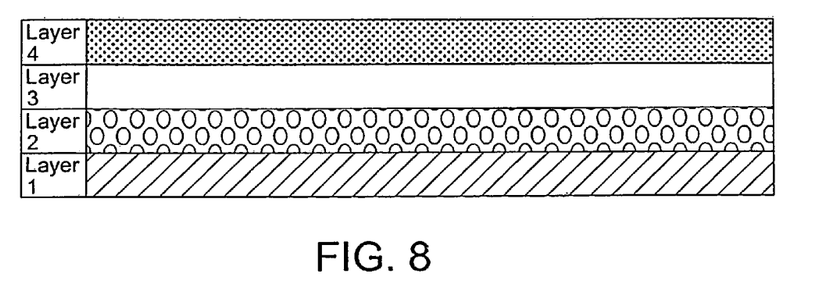
FIG. 8 is a cross-section through a printed substrate.

FIG. 8 shows an overprint schematic where Layer 1 represents a substrate, Layer 2 represents an Fe or SrFe ink layer, Layer 3 represents a white overprint, and Layer 4 represents high resolution printed indicia or images printed, for example, by a sheet offset lithographic press. As explained above, Layer 3 is omitted in some embodiments. Layer 4 may be multiple sub-layers, for example in printing in multiple colors. The substrate may also have an additional image printed Layer 4 on the other side of substrate Layer 1.

A practical product may comprise two substrates, each as shown in FIG. 8, that are intended to be used together. At least one of the pair of substrates then has a magnetically hard ink layer 2. At least one of the pair of substrates may then be thin and flexible. The substrates are preferably used with their printed Layer 4 faces in contact, because the printing Layers 3 and 4 is typically thinner than the substrate Layer 1, and the resulting smaller separation allows stronger magnetic forces for the same magnetic layers. The flexible layer then allows the two substrates to fit more closely together, if either or both of them was initially uneven or curved differently from the other.

Magnetization Options

Coils or neodymium arrays may be used to magnetize the SrFe layer. In order to magnetize a material it is necessary to apply an adequate magnetic field to it, the intensity of which depends upon the magnetic intrinsic coercive force of the material (and the direction of which depends upon the field lines to be imprinted in this material). Typically the intensity of the applied flux field should be at least two times the intrinsic coercive force (Hci) of the material, and more desirably should be three or more times Hci, the general rule being that a magnetic field three times the value of the material Hci being necessary to achieve saturation magnetization. For many of the applications of the present products, magnetization perpendicular to the plane of the ink layer, with polarity alternating over a distance of 0.5 mm to 2 mm, is desirable.

Methods of magnetization include arrays of coil inducers, and arrays of neodymium or other strong permanent magnets.

For a parallel Pole Line Array, a coil inducers as described in Burrows '628 may be used. Alternatively, a neodymium roller inducer, as described in U.S. Pat. No. 6,853,280 (Sugawara) or U.S. Pat. No. 5,942,961 (Srail et al.) may be used.

Figure 9:
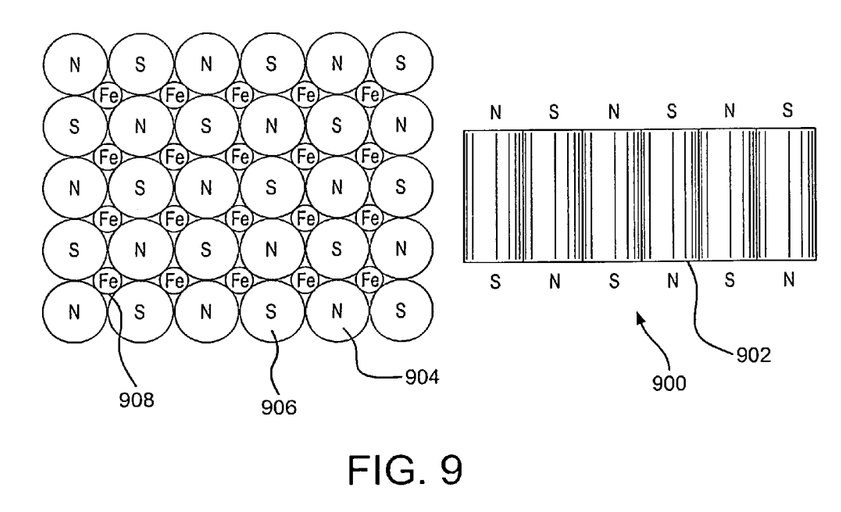
FIG. 9 is a diagrammatic side and front view of a device for magnetizing magnetizable ink layers.

Referring to FIG. 9, a neodymium grid inducer 900 for a Square Grid Pole Line Array may comprise an array of cylindrical neodymium magnets 902 packed in a square array, with their north pole surfaces 904 and south pole surfaces 906 alternating in a checkerboard pattern. The neodymium magnets 902 may of a height in the order of 15 mm. Individual pole surfaces can be, for example, 1.5 mm in diameter, in a square grid of 1.5 mm side. Alternately the grid arrangement can be of any regular, semi-regular, or other desired tessellation, or customized to provide a desired pattern of magnetization for a specific purpose. For example a hexagonal array would be possible. The neodymium pole surfaces may be in shapes other than circles. For example, they may be flattened where the magnets touch, or fully polygonal.

The neodymium grid inducer 900 may be used for grid sizes from a few mm square, with in principle no upper limit. In contrast, when small pole spacings are used in a neodymium roller array, the surface contact area of the roller and the fact that the pole direction of the neodymium roller is usually axial of the roller, and therefore parallel, with the surface being magnetized, detract from the strength of magnetization. With the inducer 900, the strength of the neodymium magnets is to some extent limited by the width of the individual magnets 902, though the ability to use relatively long magnets compensates for that to some extent. Also, the poles 904, 906 are aligned perpendicular to the surface being magnetized, so that the magnetic field is used more effectively. In general, the pole array 900 is believed to be more effective than currently available neodymium rollers at least for pole spacings less than 1.5 mm. For ink thicknesses under 0.3 mm, a pole spacing of 0.5 mm to 2 mm is found to be effective for hard ferrite inks, and under 0.15 or 1.0 mm for soft ferrite inks.

Iron cores 908 are positioned in the spaces between the pole surfaces, and serve to focus the magnetic fields. The advantage of this sort of arrangement is that the grid functions as a flat bed magnetic inducer rather than the roller type described by Sugawara. The surfaces of the magnets 902 can also be positioned at different angles and curves to magnetize irregular surfaces. Because the grid array 900 is not limited to straight parallel lines of each polarity, and naturally lends itself to patterns with rotational symmetry, a further advantage of a grid array is that paired permanently magnetizable layers can attach to each other at multiple angles, or only in a specific alignment, depending upon the symmetry of the grid. This is an advantage over parallel line multiple pole fields, as per Sugawara, in which the parallel line fields when paired only attach to each other in two orientations 180° apart, with lines parallel, and can be offset sideways by any multiple of twice the pole spacing.

The following examples illustrate in more detail formulations for the magnetizable ink:

Example 9

Particle Production Method: Ferrite particle produced by mechanical reduction—not sintered.
Size: Mean diameter 60 micron; Distribution d10 49 micron—d50 60 micron—d90 105 micron.
Density: (Benchmark is pure Fe density of 7.87 grams per cubic centimeter): Apparent density 1.85 grams per cubic centimeter; Tap density 2.39 grams per cubic centimeter.
Shape: Irregular, jagged.
Crystalline structure: Fragmented
Particles per cubic centimeter (based on spherical modeling): 4.6 million.
Surface area would be 411 $cm^2/cm^3$ if based on spherical model, >1,000 $cm^2/cm^3$ if based on stellated rhombic dodecahedron model.
Particle gap % based on spherical modeling: 69%.
Fe Purity: 97.3% Fe; 0.34% Mn; 0.48% C, 0.03% O.
Ink vehicle: according to Example 1.
Ink Vehicle Viscosity: 1182 cps.
Mixed ink Viscosity: 18020 cps.
Fe to Ink vehicle percentage: 80% wet and 84% dry.
Ink vehicle density 0.99 grams per cubic centimeter which equates approximately to particle gap estimate and percentages of the Fe to ink base, i.e. Mixed wet ink density 3.35 grams per cubic centimeter.
Suspended Fe particle density 2.36 $g/cm^3$.
Dry ink particle density: 2.39 $g/cm^3$ (equals the tap density).
Printed Ink Thickness: 60 micron.
Paired SrFe ink or SrFe coating thickness: 250 micron.
Peak magnetization of SrFe surface: 258 Gauss repeating within 2 mm pole array.
Distance between magnetized surfaces: 253 micron.
Thickness of laminated substrate: minimum thickness 0.253 mm
Magnetic load on 4-color printed surface: 0.6 grams per square cm.

Example 10

Particle Production Method: Ferrite particle produced by chemical distillation—not sintered.
Size: Mean diameter 3 micron; Distribution d10 0.8 micron—d5 0 3 micron—d9 0 5 micron.
Density: Apparent density 1.7 $g/cm^3$; Tap density 2.2 $g/cm^3$.
Shape: Rounded irregular.
Crystalline structure—high.
Particles per cubic centimeter (based on spherical modeling) 37 billion.
Surface area: (based on spherical modeling) 1046 sq. $cm^2/cm^3$.
Particle gap % based on spherical modeling: 72%.
Fe Purity: 98.5% Fe; 0.01% N, 0.03% C, 0.60% O.
Ink vehicle: Acrylic resin (23 to 27%), polymer of methyl methacrylate and butyl methacrylate, with additives of a silicone defoamer (1 to 4%), silicone dioxide (2 to 6%), chlorinated polyolefin (1 to 4%) and solvent diacetone alcohol (53-61%).
Ink Vehicle Viscosity: 890 cps.
Mixed Ink Viscosity: 14,800 cps
Fe to Ink vehicle percentage is 80% wet and 84% dry.
Ink vehicle density 1.09 $g/cm^3$ which equates approximately to particle gap estimate and percentages of the Fe to ink base.
Mixed wet ink density 1.09 $g/cm^3$.
Suspended Fe particle density: 2.0 $g/cm^3$.
Dry ink particle density 2.2 $g/cm^3$ (equals the tap density).
Printed Ink Thickness: Fe ink thickness 80 micron.
Paired SrFe ink or SrFe coating thickness: 320 micron.
Peak magnetization of paired surface: 258 Gauss repeating within 1.5 mm pole array
Distance between permanently magnetized surface and temporarily magnetized surface: 20 micron.

Magnetic load on 4c surface: The weight supported, by area, by a multi-polar magnetic field of field strength peak is 3 grams per square cm.

Example 11

Particle Production Method: Ferrite particle produced by chemical distillation and sintered.
Size: Mean diameter 5 micron; Distribution d10 1 micron—d50 5 micron—d90 10 micron.
Density: Apparent density 2.2 g/cm$^3$; Tap density 4.13 g/cm$^3$.
Shape: Rounded irregular.
Crystalline structure Reflected in increase in tap density.
Particles per cm$^3$: (based on spherical modeling) 8 billion.
Surface area per cm$^3$: (based on spherical modeling) 6283 cm$^2$.
Particle gap % based on spherical modeling:
Fe Purity: 99% Fe; 0.01% N, 0.03% C, 0.50% O.
Ink vehicle: Acrylic resin (23 to 27%), polymer of methyl methacrylate and butyl methacrylate, with additives of a silicone defoamer (1 to 4%), silicone dioxide (2 to 6%), chlorinated polyolefin (1 to 4%) and solvent diacetone alcohol (53-61%).
Ink Vehicle Viscosity: 890 cps.
Fe to Ink vehicle percentage is 80% wet and 84% dry.
Ink vehicle density:.
Mixed wet ink density:.
Suspended Fe particle density.
Dry ink particle density.
Mixed Ink Viscosity: cps
Printed Ink Thickness: Fe ink thickness 40 micron.
Paired SrFe ink or SrFe coating thickness: 250 micron.
Peak magnetization of paired SrFe ink: 258 Gauss multi-polar repeating within 1.5 mm pole array.
Distance between permanently and temporarily magnetized surfaces: 20 micron
Magnetic load on 4c surface: 1.5 g/cm$^2$.

Example 12

Particle Production Method:
Size: Mean diameter 3 to 6 micron.
Density: Tap density 4.9 g/cm$^3$.
Shape: Fractured platelets.
Crystalline structure anisotropic regular
Particles per cubic centimeter (based on spherical modeling) 11 billion.
Surface area per cubic centimeter based on spherical modeling, 6981 sq. cm; based on stellated polyhedron modeling ~14,000 cm$^2$.
SrFe Purity: 99%
Ink vehicle: Styrene Butadiene
Ink Vehicle Viscosity: 1000 cps.
SrFe to Ink vehicle percentage 65%
Mixed Ink Viscosity: 250,000 cps
Printed Ink Thickness 300 micron
Magnetization: 258 Gauss peak multi-polar with a 1.5 mm pole array
Paired magnetic layer: Example 11.
Distance between permanently and temporarily magnetized surfaces: 20 micron.
Br (MT): 415-435
Hcb (KA/m: 215-239
Hcj (KA/m): 219-243
Bhmax (Kjm3): 31.2-34.4
Magnetic load on 4c surface: 3 g/cm$^2$.
Low Viscosity Ink Bases—with Deoxidizing Agents.

Example 13

3 to 6 micron: Styrene-butadiene Copolymer, oil-extended Rubber with Aromatic oil. Specific Gravity 0.91-096. Viscosity 500±150 cps. Mixed viscosity 70% SrFe 15500 cps.

Example 14

SrFe 3 to 6 micron:
Polymer of methyl methacrylate and butyl methacrylate: 23-27%
Diacetone alcohol 56-65%.
Silicone defoamer 1-4%,
Silicone dioxide 2-6%.
Chlorinated Polyolefin 1-4%.
Viscosity of carrier: 500±150 cps.
After mixing 70% SrFe 3 to 6 micron: viscosity 15000.

Example 15

5 Micron Fe

Polymer of methyl methacrylate and butyl methacrylate 23-27%.
Diacetone alcohol 53-61%.
Silicone defoamer 1-4%,
Silicone dioxide 2-6%.
Chlorinated Polyolefin 1-4%.
Viscosity of carrier: 550±150 cps.
After mixing with 80% 5 micron Fe, viscosity 14800–11020 cps.

Table 3 lists comparative results for the load supporting capacity of various pairs of magnetizable layers from the above Examples. In each case, both contacting surfaces were offset litho printed. The column "space between magnetizable layers" shows the spacing created by the printing and any other layers over the actual magnetizable layer. In Comparison Example 9, a laminate layer 0.253 mm thick was necessary because the large magnetic particles produced a surface unsuitable for direct printing on the Fe layer.

TABLE 3

| Examples | Peak Magnetic Strength (Gauss) | Pole Pitch (mm) | SrFe Ink Thickness (micron) | Fe Layer Thickness (micron) | Space between magnetizeable layers (micron) | load supported (g/cm$^2$) |
|---|---|---|---|---|---|---|
| 10 & 12 | 258 | 1.5 | 300 (70% SrFe) | 35 (80% Fe) | 20 | 2 |
| 10 & 12 | 258 | 1.5 | 300 (70% SrFe) | 50 (80% Fe) | 20 | 3 |
| 11 & 12 | 258 | 1.5 | 300 (70% SrFe) | 35 (80% Fe) | 20 | 1.5 |
| 9 & 12 | 258 | 1.5 | 300 (70% SrFe) | 120 (80% Fe) | 253 | 0.6 |

Variations can be obtained by designers skilled in the art.

Although specific embodiments have been shown and described, the skilled reader will understand how features of different embodiments may be combined to form other products and devices within the scope of the present invention.

The skilled reader will also understand how various alternatives and modifications may be made within the scope of the present invention.

The preceding description of the presently contemplated best mode of practicing the invention is not to be taken in a limiting sense, but is made merely for the purpose of describing the general principles of the invention. The full scope of the invention should be determined with reference to the Claims.

The invention claimed is:

1. A method to generate a magnetic print pattern on a substrate using a printer, comprising the steps of:
    disposing a first magnetizable ink layer on said substrate by a printer;
    disposing a second magnetizable ink layer on said substrate by the printer, wherein said first magnetizable ink layer contains hard ferrite particles and a first ink base, and said second magnetizable ink layer contains soft ferrite particles and a second ink base, and said hard ferrite particles are about 3 to 10 microns in diameter, and said soft ferrite particles are about 3 to 10 microns in diameter;
    disposing a third layer having a print pattern as a top layer on said substrate by the printer; and
    permanently magnetizing said first layer by using a magnetic field,
    wherein said magnetized first ink layer and said second magnetizable ink layer magnetically interact with each other.

2. The method of claim 1, wherein said hard ferrite particles are made of strontium ferrite (SrFe) particles.

3. The method of claim 2, wherein more than 50% said strontium ferrite particles are bigger than 3 microns.

4. The method of claim 1, wherein said soft ferrite particles are made of iron (Fe) particles.

5. The method of claim 4, wherein more than 50% of said iron (Fe) particles are bigger than 3 microns.

6. The method of claim 1, wherein said first ink base contains acrylic resin.

7. The method of claim 1, wherein said second ink base contains acrylic resin.

8. The method of claim 1, wherein said first magnetizable ink: layer is about 200 to 250 micron thick and said second magnetizable ink: layer is about 35 to 100 micron thick.

* * * * *